Nov. 13, 1951 P. SCHELL 2,574,762
SOLENOID VALVE
Filed June 26, 1948
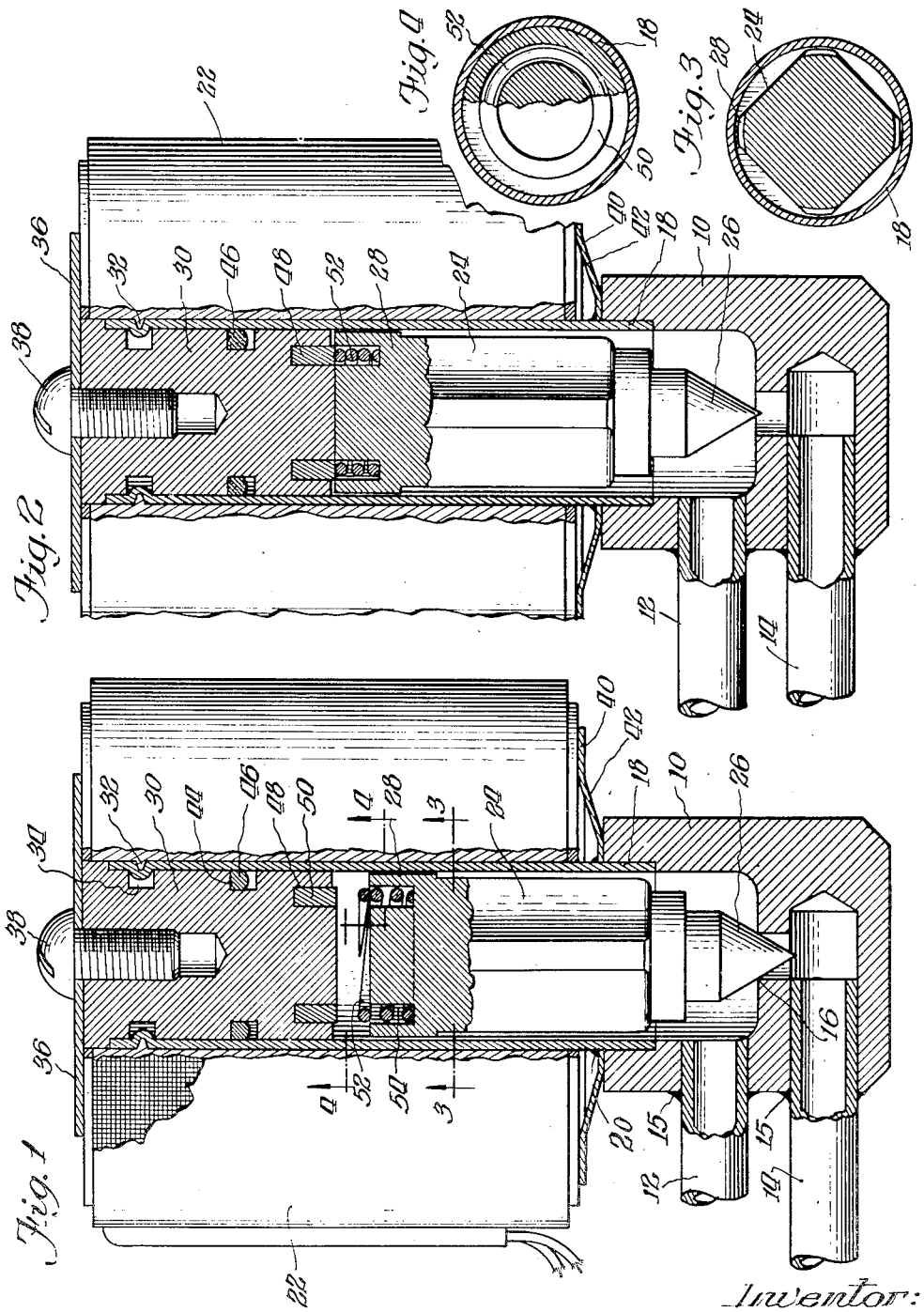
Inventor:
Paul Schell.
By: Bair & Freeman
Attys.

Patented Nov. 13, 1951

2,574,762

UNITED STATES PATENT OFFICE 2,574,762

SOLENOID VALVE

Paul Schell, Elkhart, Ind., assignor to Penn Electric Switch Co., Goshen, Ind., a corporation of Iowa Application June 26, 1948, Serial No. 35,331

2 Claims. (Cl. 175—338)

1

This invention relates to a solenoid valve of the type wherein a solenoid plunger has a valve plug formed thereon for engaging a valve seat when the solenoid is deenergized and permitting flow through the valve seat when the solenoid is energized.

One object of the invention is to provide a solenoid valve which is comparatively simple in construction yet reliable in operation and which can be manufactured economically.

Another object is to provide a solenoid valve in which the plunger may be contained in a chamber connected with the valve and therefore charged with any fluid passing through the valve, novel means being provided to seal the plunger chamber against leakage to atmosphere.

Still another object is to provide a kickoff spring associated with the plunger and occupying a particular position in relation to a shading ring of the valve.

A further object is to provide a solenoid valve assembly in which the parts may be readily connected together during manufacture.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Figure 1 is a side elevation partly in vertical section showing a solenoid valve embodying my present invention, the valve being shown in closed position.

Figure 2 is a similar view in which the valve is shown in open position, and

Figures 3 and 4 are sectional views on the lines 3—3 and 4—4, respectively of Figure 1.

On the accompanying drawing I have used the reference number 10 to indicate a valve body, 12 an inlet pipe thereto and 14 an outlet pipe therefrom. The pipes 12 and 14 may be permanently connected in the valve body as by soldering indicated at 15. Within the valve body between the inlet and outlet pipes is a valve seat 16.

A plunger tube 18 is soldered at 20 in the body 10 and has a solenoid coil 22 wound thereon, the usual insulation spool being provided to prevent short circuits. A plunger 24 is slidable in the plunger tube 18 and has a pointed lower end 26 to normally seat on the valve seat 16 by gravity.

The main portion of the plunger 24 is square as illustrated in Figure 3, its diametrical extremities at the upper end being slightly enlarged as indicated at 28 for guide purposes. The square

2 shape permits ready flow of fluid past the upper end of the plunger so as not to restrict its motion during operation.

A magnetic plug 30 is located in the upper end of the plunger tube 18 and is retained in position by an annular rib 32 depressed into the tube as by a rolling operation after the plug is inserted. The annular rib 32 enters a groove 34 of the plug 30. The solenoid coil 22 is then retained in position by a washer 36 and a screw 38, the opposite end of the coil having a washer 40 thereagainst provided with a plurality of spring fingers 42 which engage the valve body 10 and resiliently take up any play between the solenoid coil and the valve body.

With the arrangement disclosed, it is obvious that the interior of the plunger tube 18 is in communication with the fluid flowing through the valve. To seal the plunger tube against leakage to atmosphere the plug 30 is provided with a groove 44 in which a sealing ring of rubber or the like 46 is located. Any pressure against this ring tends to compress it in the groove 44 and against the inner wall of the tube 18 to increase the effectiveness of the seal.

The solenoid disclosed is especially adaptable for alternating current. To minimize hum the plug 30 is provided with an annular groove 48 in which a copper shading ring 50 is located.

In the operation of a solenoid valve it is desirable to have a kick-off spring. Springs of this character have been provided in various locations but in my valve the kick-off spring is shown at 52 and is located in an annular groove 54 which is complementary to the groove 48. Accordingly the kick-off spring 52 is in alignment with the shading ring 50 and therefore does not cut down the flux path which occurs across from the plunger 24 to the plug 30. The magnetic pull on the plunger accordingly is not reduced by the use of a kick-off spring because it is located in alignment with the shading ring where there is no flux flow anyway due to the presence of the ring. Accordingly the use of the kick-off spring at this particular location does not decrease the efficiency of the solenoid in its action on the plunger.

When the solenoid 22 is deenergized gravity causes the valve to close as in Figure 1. Energization of the coil causes the plunger 24 to be attracted toward the plug 30 and finally engage it as in Figure 2. This position will be held as long as the coil is energized.

Upon deenergization, magnetism in the plunger and plug substantially disappears so that gravity can again close the valve. There is always some residual magnetism and this tends to keep the upper end of the plunger engaged with the lower end of the plug. The spring 52 however is under compression as is obvious from comparing Figure 2 with Figure 1 so that it tends to separate these surfaces and thereby insures reclosing of the valve promptly on cessation of the current.

Some changes may be made in the construction and arrangement of the parts of my device without departing from the real spirit and purpose of my invention, and it is my intention to cover by my claims any modified forms of structure or use of mechanical equivalents which may be reasonably included within their scope.

I claim as my invention:

1. In a solenoid, a plunger tube, a solenoid plunger slidable in said plunger tube, a magnetic plug for the outer end of said plunger tube, said plug having a circular shading ring therein, said plunger having a complementary circular groove of substantially the same shape and area and aligned with said circular shading ring, and a kick-off spring located in said groove and thereby aligned with said shading ring.

2. In a solenoid, a plunger tube, a solenoid plunger slidable in said plunger tube, a magnetic plug for the outer end of said plunger tube, said plug and plunger having complementary circular grooves of substantially the same shape and area and aligned with each other, a shading ring in one of said grooves, and a kick-off spring located in the other groove and thereby aligned with said shading ring only.

PAUL SCHELL.

REFERENCES CITED

The following references are of record in the file of this patent:

UNITED STATES PATENTS

| Number | Name | Date |
|---|---|---|
| 1,124,599 | Fessenden | Jan. 12, 1915 |
| 1,252,312 | Warren | Jan. 1, 1918 |
| 2,098,195 | Ray | Nov. 2, 1937 |
| 2,121,657 | Fisher | June 21, 1938 |
| 2,207,082 | Wetzel | July 9, 1940 |
| 2,222,419 | McCarty | Nov. 19, 1940 |
| 2,297,626 | Lenholm | Sept. 29, 1942 |
| 2,343,806 | Scofield | Mar. 7, 1944 |
| 2,353,835 | Lane | July 18, 1944 |
| 2,360,945 | Garner | Oct. 24, 1944 |
| 2,449,438 | Wisegarver | Sept. 14, 1948 |
| 2,458,123 | Wasserlein | Jan. 4, 1949 |